March 10, 1959

A. M. RAFF ET AL 2,876,818

POLYETHYLENE BOTTLE

Filed Oct. 28, 1955

INVENTOR.
ALLAN M. RAFF &
EDWARD V. SVEDRES
BY

ATTORNEYS 2,876,818
POLYETHYLENE BOTTLE

Allan M. Raff, Cheltenham, and Edward V. Svedres, Ambler, Pa., assignors to Smith, Kline & French Laboratories, Philadelphia, Pa., a corporation of Pennsylvania Application October 28, 1955, Serial No. 543,527

4 Claims. (Cl. 150—.5)

This invention relates to a polyethylene bottle and, more particularly, relates to a polyethylene bottle which has an inner lining.

Polyethylene bottles have been widely used as containers for organic aromatic and aliphatic compounds particularly in the form of squeeze bottles for pharmaceutical products. Although such bottles have been a highly successful commercial product, they have a serious disadvantage. Polyethylene is somewhat permeable and permits the transmission of many organic aromatic and aliphatic compounds which are either liquids themselves or packaged together with solvents. This necessarily results both in considerable losses of the packaged product as well as the disfigurement of the appearance of the container.

In accordance with this invention, these difficulties have been overcome by providing the container with a non-permeable liner. Numerous attempts have been made heretofore to solve this problem on this basis. Heretofore no solution has been achieved due to the difficulty of achieving non-permeability combined with the requisite flexibility required for a squeeze bottle. Heretofore, where non-permeability has been achieved, the liner was such that it could not be properly flexed or, alternatively, on flexing, was cracked or otherwise damaged.

In accordance with this invention, the problem has been solved by providing the polyethylene bottle with a thin liner of a vinylidene chloride-acrylonitrile copolymer which is only weakly bonded to the interior surface of the polyethylene bottle and permits relative movement between the liner and the bottle. The liner in accordance with this invention will preferably have a thickness of from about 0.0002" to about 0.001".

Advantageously, the vinylidene chloride content of the copolymer will be from about 65% to about 95%. The copolymer is available commercially as, for example, "Saran F-120" produced by the Dow Chemical Company.

The bottles which are lined in accordance with this invention are made, as previously indicated, of polyethylene. More specifically, the polyethylene will have a molecular weight of from about 10,000 to about 20,000.

The liner is placed in the polyethylene bottle by first placing the copolymer in solution using a suitable solvent such as, for example, methyl ethyl ketone. When methyl ethyl ketone is used, it is desirable to also employ some trichloroethylene in order to reduce the inflammability of the solvent. In the solution the copolymer will be from about 10% to about 20% by weight of the solvent mixture. When trichloroethylene is employed, it will be used in an amount not in excess of 46.5% by weight of the copolymer-solvent solution.

The copolymer solution is then applied to the interior of the polyethylene bottle, i. e., by spraying or injection. It has also been found to be highly satisfactory to fill the polyethylene bottle with the copolymer solution and then empty it. After the copolymer solution has been applied by one of these methods, it is permitted to air dry. If desired to speed up the lining process, warm air can be circulated around the drying bottle.

This invention will be further clarified by reference to the following description read in conjunction with the drawings in which.

Figures 1, 2:
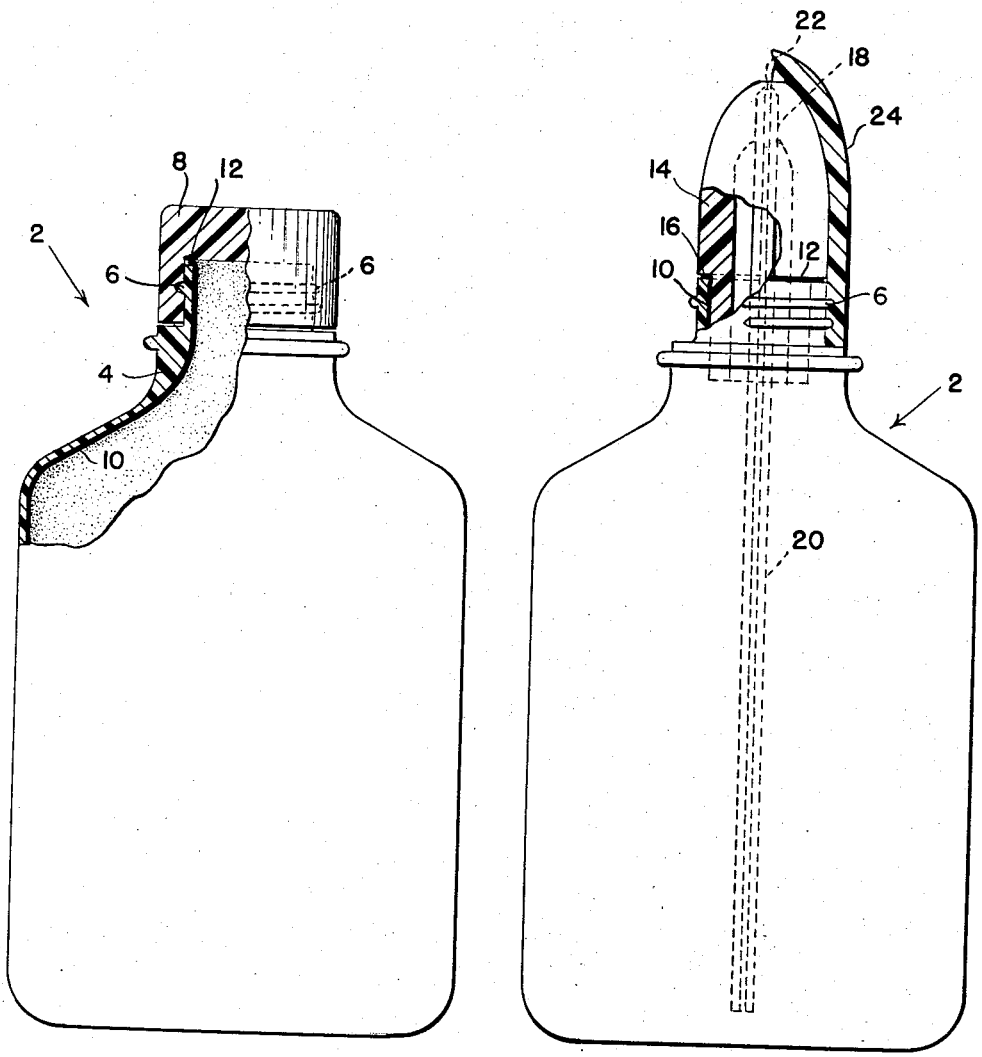
Figure 1 is a front elevation partially broken away of a bottle in accordance with this invention.
Figure 2 is a front elevation of an alternative embodiment of a bottle in accordance with this invention.

As shown in Figure 1, a bottle 2 is provided with a polyethylene body 4 having a threaded neck portion 6. A cap 8 is threadably secured to neck 6 and may be molded using, for example, a synthetic resin such as urea formaldehyde, polyvinyl or a phenolic resin. A metal cap of, for example, aluminum or steel can also be employed. Bottle 2 has a liner 10 which is a vinylidene chloride-acrylonitrile copolymer. As shown, liner 10 has a lip 12 which overlies a portion of the top of neck 6.

As shown in Figure 2, alternative closure means may be employed with the lined bottle 2. A hollow plug 14 is inserted inside neck 6 and bears against liner portion 10 which is in neck 6. Plug 14 has a flange 16 which bears against a lip 12 of liner 10. As is conventional in squeeze bottles, plug 14 has secured in bore 18 a tubular member 20 which registers with a discharge opening 22. A closure cap 24 is threadably secured to neck 6.

It is not desired to be limited except as set forth in the following claims.

What is claimed is:

1. As a new article of manufacture: a flexible bottle formed of polyethylene, a liner bonded to the interior of said bottle and adapted to flex when the bottle is subjected to flexing, said liner being a vinylidene chloride-acrylonitrile copolymer.

2. As a new article of manufacture: a flexible bottle formed of polyethylene, a liner bonded to the interior of said bottle and adapted to flex when the bottle is subjected to flexing, said liner being a vinylidene chloride-acrylonitrile copolymer and being from about 0.0002" to about 0.001" in thickness.

3. As a new article of manufacture: a flexible bottle formed of polyethylene, a liner bonded to the interior of said bottle and adapted to flex when the bottle is subjected to flexing, said liner being a vinylidene chloride-acrylonitrile copolymer having a vinylidene chloride content of from about 65% to about 95%.

4. As a new article of manufacture: a flexible bottle formed of polyethylene, a liner bonded to the interior of said bottle and adapted to flex when the bottle is subjected to flexing, said liner being a vinylidene chloride-acrylonitrile copolymer having a vinylidene chloride content of from about 65% to about 95% and said liner being from about 0.0002" to about 0.001" in thickness.

References Cited in the file of this patent

UNITED STATES PATENTS

| | | |
|---|---|---|
| 1,166,862 | Smoot | Jan. 4, 1916 |
| 2,531,745 | Schopmeyer | Nov. 28, 1950 |
| 2,684,919 | Berry et al. | July 27, 1954 |
| 2,713,369 | Strahm | July 19, 1955 |
| 2,776,691 | Tupper | Jan. 8, 1957 |
| 2,781,551 | Richerod | Feb. 19, 1957 |